No. 661,981. Patented Nov. 20, 1900.
R. HARDING.
SIDE BEARING FOR RAILWAY CARS.
(Application filed Aug. 23, 1900.)
(No Model.)

Witnesses
W. H. Alexander
Roy Gray

Inventor
Russell Harding
By Attorneys
Fowler & Fowler

THE NORRIS PETERS CO., PHOTO-LITHO., WASHINGTON, D. C.

UNITED STATES PATENT OFFICE.

RUSSELL HARDING, OF ST. LOUIS, MISSOURI.

SIDE BEARING FOR RAILWAY-CARS.

SPECIFICATION forming part of Letters Patent No. 661,981, dated November 20, 1900.

Application filed August 23, 1900. Serial No. 27,752. (No model.)

*To all whom it may concern:*

Be it known that I, RUSSELL HARDING, a citizen of the United States, residing at the city of St. Louis, in the State of Missouri, have invented a certain new and useful Side Bearing for Railway-Cars, of which the following is such a full, clear, and exact description as will enable any one skilled in the art to which it appertains to make and use the same, reference being had to the accompanying drawings, forming part of this specification.

One object of my invention is to provide a durable antifriction side bearing for railway-cars which relieves the weight resting on the center bearing.

Another object of my invention is to provide means for readily replacing the antifriction-rollers in case they become broken or worn.

My invention consists, primarily, in the combination with the body-bolster and truck-bolster of a car of two antifriction-rollers, one secured to each of said bolsters, said rollers being arranged at an angle to each other.

My invention also consists in other novel features and details of construction, all of which are described in the following specification and pointed out in the claims affixed hereto.

Figure 1:
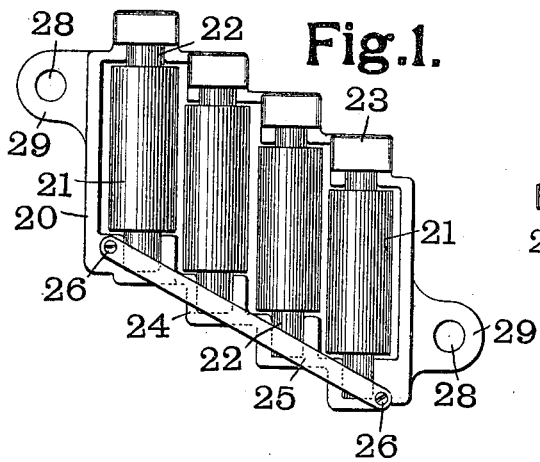
Figure 2:
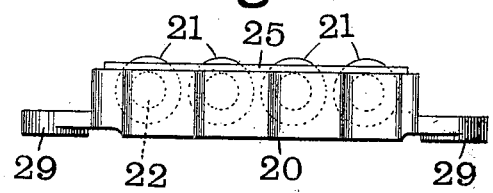
Figure 3:
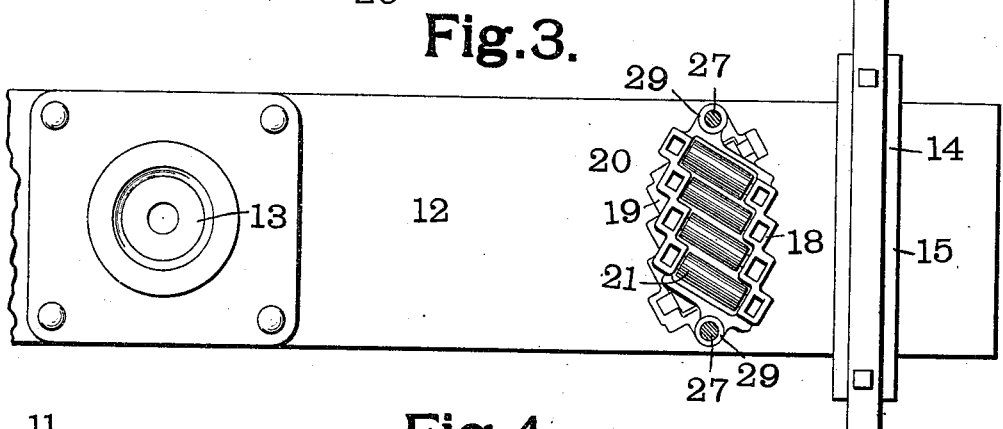
Figure 4:
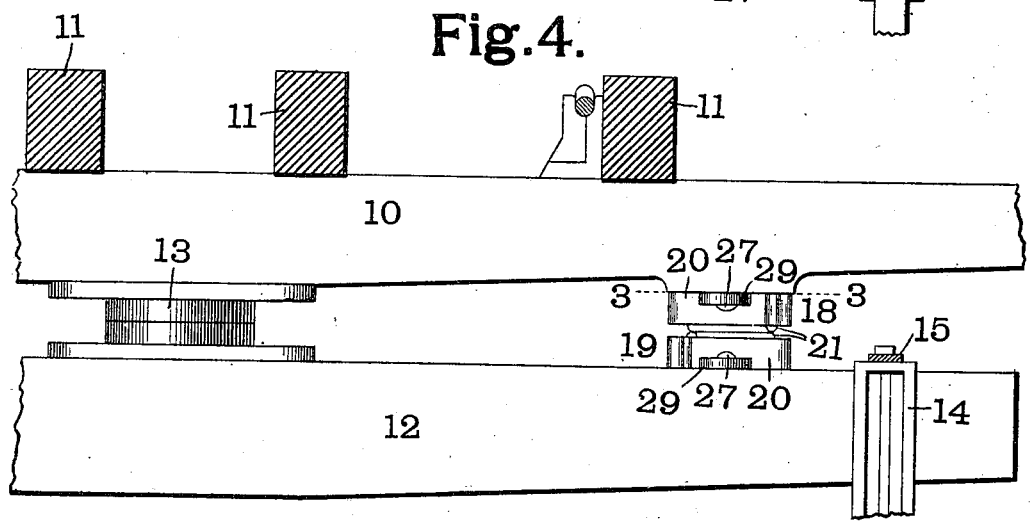

In the accompanying drawings, which illustrate one form of side bearing made in accordance with my invention, Figure 1 is a top plan view, on an enlarged scale, of one of the bearings. Fig. 2 is a side view of the same, also on an enlarged scale. Fig. 3 is partly a top plan view of the truck-bolster and partly a section on the line 3 3 of Fig. 4, and Fig. 4 is a side view of the body and truck bolster.

Like marks of reference refer to similar parts in the several views of the drawings.

10 is the body-bolster, which is secured to the sills 11 in the usual manner. The body-bolster 10 is connected to the truck-bolster 12 by means of a center bearing 13.

14 is a truck-end casting, and 15 an arch bar. The above-named parts may be of any usual construction.

18 is the upper side bearing, secured to the body-bolster 10, and 19 the lower side bearing, secured to the truck-bolster 12. The upper and lower side bearings 18 and 19 are alike in all respects. Each of the side bearings consists of a casing 20, in which are journaled antifriction-rollers 21, provided with journals 22. In the form shown in the drawings there are four rollers in each casting; but this number may be varied at pleasure. The journals 22 of the rollers 21 fit in journal-bearings 23 and 24, formed in the casing 20. The tops of the bearing 23 are closed, while those of the bearing 24 are left open to allow the rollers 21 to be inserted in the casing. The journals 22 of the rollers 21 are held in the journal-bearings 24 by a bar 25, which is secured to the casing 20 by means of screws 26. By removing one of the screws 26 the bar 25 can be swung around, so as to uncover the journals 22, thus allowing the removal of a broken or worn roller and the insertion of a new one. The bearings 18 and 19 are arranged so that the rollers 21 in one of the said bearings are at an angle to those in the other, as best shown in Fig. 3, and are secured to the bolsters 10 and 12, respectively, by means of bolts 27, passing through holes 28 in lugs 29, carried by the casings 20 and preferably formed integral therewith.

The arrangement of the two sets of antifriction-rollers at an angle to each other allows the rollers to pass smoothly over one another and at the same time prevents the rollers from becoming flattened, as is likely to occur when rollers pass over a flat surface.

Having fully described my invention, what I claim as new, and desire to secure by Letters Patent of the United States, is—

1. The combination with the body-bolster of a car and its corresponding truck-bolster, of an antifriction-roller secured to said body-bolster, and an antifriction-roller secured to said truck-bolster, said rollers being arranged at an angle to each other.

2. The combination with the body-bolster of a car and its corresponding truck-bolster, of a plurality of antifriction-rollers secured to said body-bolster, and a plurality of antifriction-rollers secured to said truck-bolster, the rollers on one of said bolsters being arranged at an angle to those on the other.

3. The combination with the body-bolster of a car and its corresponding truck-bolster, of a casing carried by said body-bolster, a roller removably secured in said casing, a casing secured to said truck-bolster and a roller removably secured in said second casing, said rollers being arranged at an angle to each other.

4. The combination with the body-bolster of a car and its corresponding truck-bolster, of a casing carried by said body-bolster, a plurality of rollers removably secured in said casing, a casing carried by said truck-bolster, and a plurality of rollers removably secured in said second casing, the rollers in one of said casings being arranged at an angle to those in the other.

In testimony whereof I have hereunto set my hand and affixed my seal in the presence of two subscribing witnesses.

RUSSELL HARDING. [L. S.]

Witnesses:
F. J. McLEAN,
LOUIS A. HOEN.